No. 765,939. PATENTED JULY 26, 1904.
F. M. ROZIER.
APPARATUS FOR MAKING CEMENT PIPES.
APPLICATION FILED SEPT. 26, 1903.
NO MODEL. 2 SHEETS—SHEET 1.
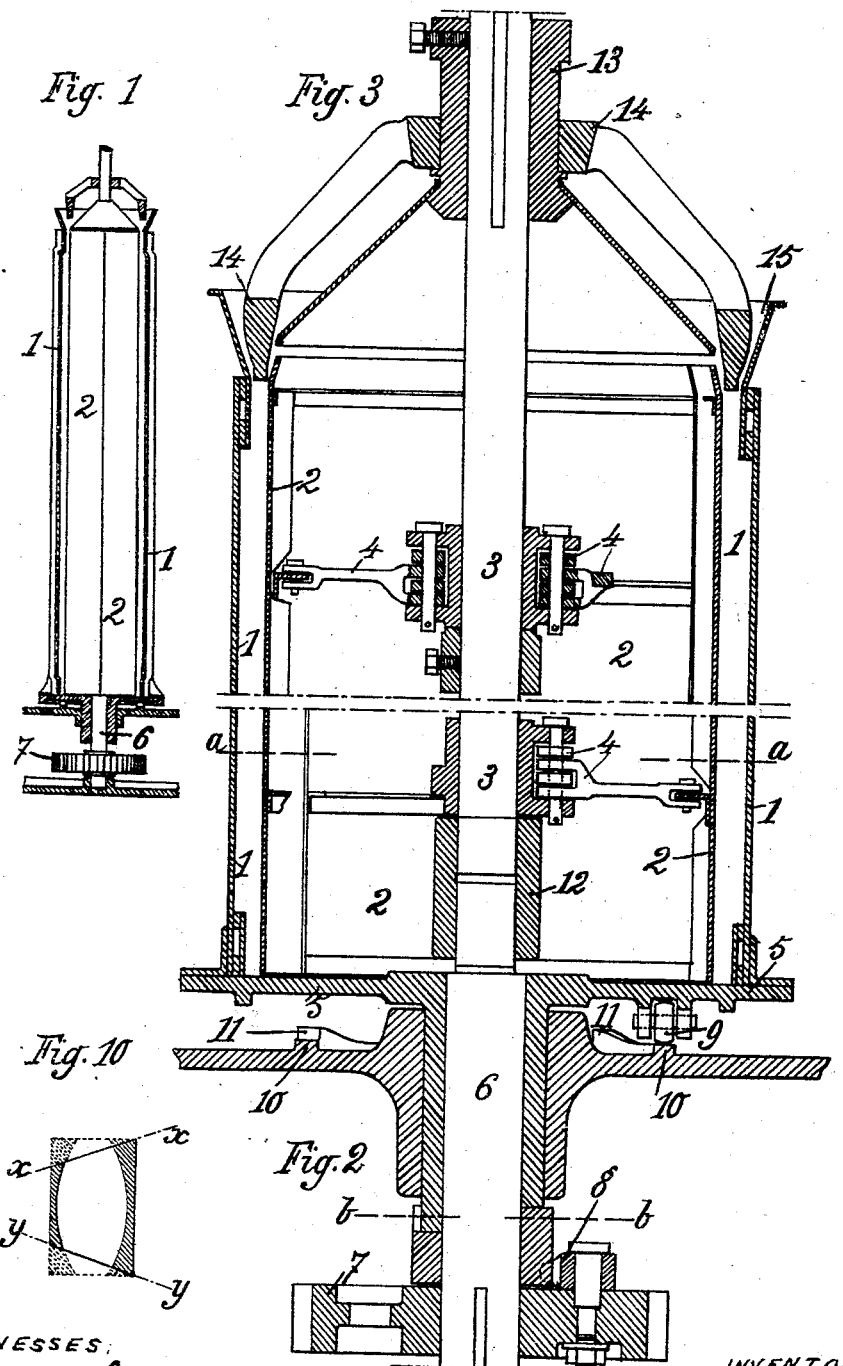

No. 765,939. PATENTED JULY 26, 1904.
F. M. ROZIER.
APPARATUS FOR MAKING CEMENT PIPES.
APPLICATION FILED SEPT. 26, 1903.
NO MODEL. 2 SHEETS—SHEET 2.
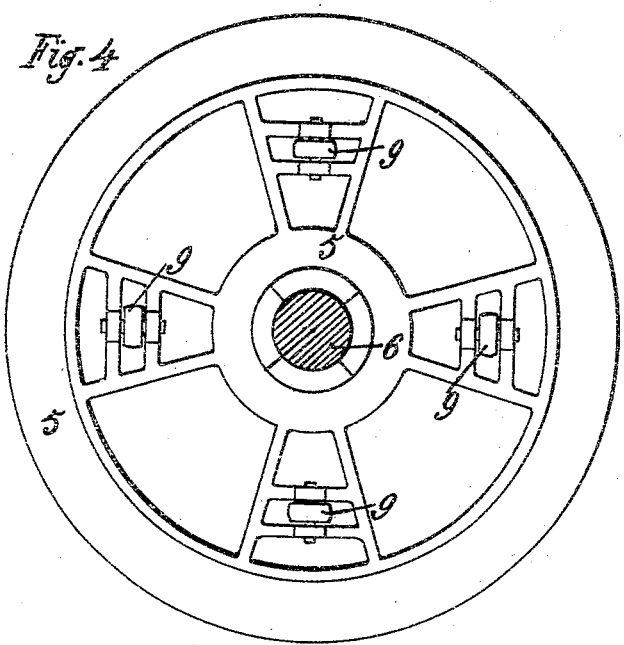
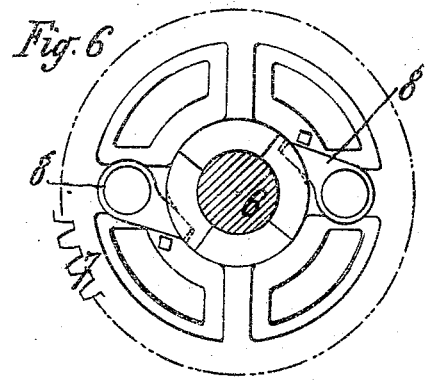
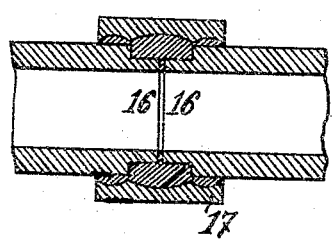
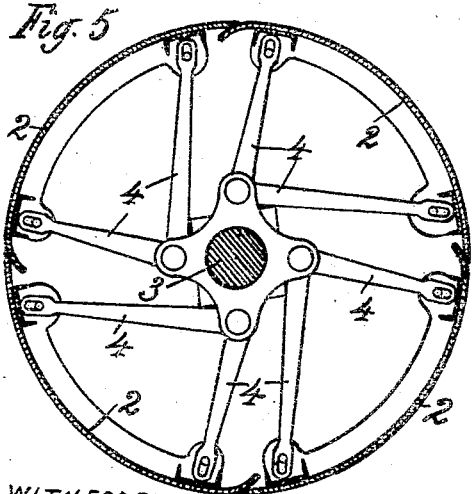
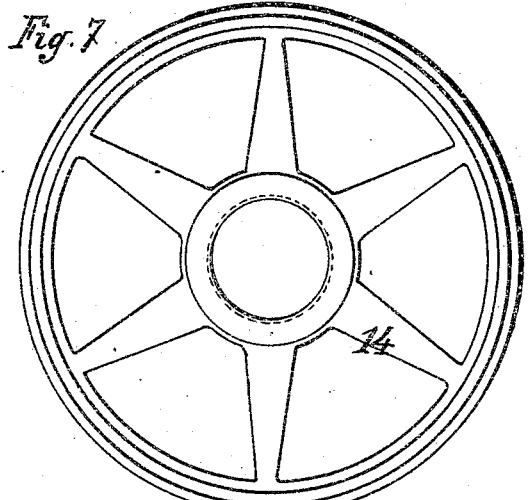

No. 765,939. Patented July 26, 1904.

UNITED STATES PATENT OFFICE.

FRANÇOIS MARIE ROZIER, OF LE RAINCY, FRANCE.

APPARATUS FOR MAKING CEMENT PIPES.

SPECIFICATION forming part of Letters Patent No. 765,939, dated July 26, 1904.

Application filed September 26, 1903. Serial No. 174,791. (No model.)

*To all whom it may concern:*

Be it known that I, FRANÇOIS MARIE ROZIER, a citizen of the Republic of France, and a resident of 123 Avenue du Chemin-de-fer, Le Raincy, France, have invented a certain new and useful Improvement in Apparatus for Making Cement Pipes, of which the following is a specification.

This invention relates to an improved method of making pipes, joints, elbows, sleeves, and cylindrical branches of beton or cement mortar strengthened with insertions and compressed and apparatus for carrying out the process.

In the accompanying drawings, Figure 1 is a view as a whole in vertical section of an apparatus intended for the manufacture of a pipe; Fig. 2, a detail, on an enlarged scale, of the lower part of the apparatus; Fig. 3, a similar view of the upper part. Fig. 4 is a view from beneath of the lower plate. Figs. 5 and 6 are horizontal sections, respectively, on the lines *a a* and *b b* of Fig. 2. Fig. 7 is a plan view of the upper ring or crown; Fig. 8, a projection of the rolling track. Fig. 9 is a section of a means for connecting fresh pipes, and Fig. 10 a detail view of a pipe intended for the manufacture of a drain or sewer elbow.

1 is an external metallic mold in one or more pieces, constituting a surface of revolution.

2 is an internal cylindrical mandrel also formed of several parts—for instance, four—juxtaposed along generating-lines of the cylinder and terminated at one end by a tapered edge and at the other by a slightly-bent upper edge, so as to fit over and form an outwardly approximately perfect cylinder.

Each part of the mandrel 2 is connected to a vertical shaft by an arrangement of eccentric-rods 4, enabling the said mandrel to increase its diameter without the edges of its constituent parts ceasing to connect or fit.

The mold 1 is mounted on a plate 5, adapted to receive a rotary movement from a shaft 6, operated in turn by a toothed wheel 7, by means of a pawl arrangement 8. The wheel 7 receives its movement from a motor in any suitable manner.

The plate 5 rests, by means of rollers 9, on a traveling track 10, provided with shoulders 11, intended to cause a violent jerking movement. The internal mandrel 2 also shares in the rotary motion, the shafts 3 and 6 being connected by a connecting-sleeve 12. Toward the upper end of the shaft 3 an externally-threaded ring 13 is keyed and fixed, on which is mounted a crown, ring, or sleeve lid 14.

When the apparatus is at work, the beton delivered from a suitable mixer falls into a suitable hopper 15, from whence it slips between the cylinder 1 and the mandrel 2, the whole having a somewhat slow rotary motion. A metallic armature has been previously introduced into the space left between the two cylinders and permanently fixed in any suitable manner. The combined action of this circular movement and the vertical shocks produced by the shoulders or declivities 11 insures a regular filling of the mold, as well as a perfect beating down of the mass of beton or mortar. The mold being filled, the lid 14 is turned on its ring support so as to bring it between the ends of the mold 1 and the mandrel 2, thus compressing the beton. Then this mandrel is given a rapid rotary motion in an inverse direction to the former, the mold being stationary, the projections 11 arresting the rollers 9. In consequence of the difference of length of the rods 4 and the presence of masses of lead, which may, if desired, be arranged in this region, the various free parts of the mandrel 2 under the action of centrifugal force exert on the beton, which cannot escape in any part, strong lateral pressure from the inside toward the outside. During the movement there is also produced a slight separation between the different arcs which constitute the core, and any excess of water is driven out of the beton and flows toward the center and easily escapes at the same time, as the interior of the tube is made perfectly smooth. The apparatus having been brought to a standstill, the pipe or the like may be removed from the mold. In order to facilitate this operation and prevent the adherence of the beton to the internal walls of the mold, these walls are polished and coated before the material is run in with a greasy insulating-body, or it may be coated with opaline or any other suitable material.

If the pipes to be made have to resist strong internal pressures, a greater strength and more perfect tightness is insured by bringing toward the end of the operation the mandrel 2 to its minimum diameter and introducing in the space left free between the cylinder and the said mandrel a stream or strip of pure cement. By giving the apparatus a vigorous rotary movement the cement is projected into and penetrates all the interstices of the beton, while its surface is at the same time smoothed by the mandrel. This method of manufacture tends to maintain the densest material—that is to say, the cement—toward the internal face of the cylinder. By operating by the same process of manufacture and simply changing the form of the parts 1 and 2 it is evident that all kinds of pipes, cylindrical or conical, may be obtained with an internal surface of revolution.

Pipes may more particularly be made the ends 16 of which have the form shown in Fig. 9, with the object of their being connected together. This latter is done by means of a sleeve 17 of the form indicated. The sleeve is slipped over the pipes until it occupies the desired position. Then cement is run under pressure into the space left free between the justaposed pieces. Elbows with a large angle—one-eighth, for instance—may also be made in the same manner. In this case the apparatus is arranged in order to obtain pipes, as shown in Fig. 10, the internal surface of which assumes an ovoid form. When removed from the mold, the pipes are divided along the planes of juncture $x\,x$ and $y\,y$. The thickness of the walls toward this part is sufficient to allow of a shoulder for the manufacture of a joint being obtained.

I claim as my invention—

1. Apparatus for manufacturing cement pipes, comprising an external mold and an internal mandrel of substantially the diameter and configuration of the interior of the pipe to be produced, and means for rotating and at the same time expanding said mandrel, substantially as described.

2. Apparatus for manufacturing cement pipes, comprising an external mold and an internal mandrel of substantially the diameter and configuration of the interior of the pipe to be produced, and means for rotating and at the same time expanding said mandrel, in combination with a lid fitting between the mold and mandrel at their upper ends.

3. Apparatus for manufacturing cement pipes, comprising an external mold and an internal mandrel and means for rotating and expanding said mandrel, in combination with means for raising and lowering said mold during its rotation, substantially as described.

4. Apparatus for manufacturing cement pipes, comprising an external mold, a plate therefor and a ratchet and driving means for rotating said plate in one direction, an internal mandrel and means for rotating said internal mandrel in both directions, and means for expanding the mandrel, substantially as described.

5. Apparatus for manufacturing cement pipes, comprising a circular track having shoulders, a plate resting on said shoulders and carrying an external mold, a vertical shaft adapted to rotate said plate and an internal mandrel, substantially as described.

6. Apparatus for manufacturing cement pipes, comprising a circular track having shoulders, a plate resting on said shoulders and carrying an external mold, a vertical shaft adapted to rotate said plate and an internal mandrel, means to prevent the rotation of said plate and mold in one direction and means to rotate said mandrel in either direction, substantially as described.

7. Apparatus for manufacturing cement pipes, comprising a circular track having shoulders, a plate resting on said shoulders and carrying an external mold, a vertical shaft adapted to rotate said plate and an internal mandrel, in combination with means to rotate said mandrel and to expand it during rotation, substantially as described.

8. Apparatus for manufacturing cement pipes, comprising an external mold, an internal mandrel of a number of parts forming a closed body, a shaft, rods connecting said shaft and parts, and means to rotate said shaft and at the same time to expand the parts, substantially as described.

9. Apparatus for the manufacture of cement pipes, comprising an external mold, a revoluble internal mandrel of a number of parts, the adjacent edges of the parts being formed, one tapered and the other bent to project inside said tapered edge, and means for expanding said parts during rotation, substantially as described.

10. Apparatus for the manufacture of cement pipes, comprising an external mold, an internal mandrel of a number of parts, a rotatable shaft and eccentric-rods connecting said parts and shaft, substantially as described.

11. Apparatus for the manufacture of cement pipes, comprising an external mold, an internal mandrel of a number of parts, a rotatable shaft, one short eccentric-rod and one longer eccentric-rod connecting each part with said shaft, substantially as described.

12. Apparatus for the manufacture of cement pipes, comprising an external mold, an expansible internal mandrel of substantially the diameter and configuration of the interior of the pipe to be produced, said mandrel being made up of a number of parts, a shaft and rods connecting said parts and shaft, and so disposed that in rotating one edge of each of said parts will be brought nearer to the mold than the other edge, substantially as described.

13. Apparatus for manufacturing cement pipes, comprising an external mold and an internal mandrel and means for rotating and expanding said mandrel at the same time, in combination with means for raising and lowering said mold during its rotation, substantially as described.

In testimony whereof I have signed my name to this specification in the presence of two subscribing witnesses.

FRANÇOIS MARIE ROZIER.

Witnesses:
ALPHONSE MÉJEAN,
AUGUSTUS E. INGRAM.